United States Patent
Nagano et al.

(10) Patent No.: US 7,623,890 B2
(45) Date of Patent: Nov. 24, 2009

(54) RECEIVER

(75) Inventors: Soichi Nagano, Tokyo (JP); Hiroyuki Nagahama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 629 days.

(21) Appl. No.: 11/106,532

(22) Filed: Apr. 15, 2005

(65) Prior Publication Data

US 2005/0272385 A1 Dec. 8, 2005

(30) Foreign Application Priority Data

May 21, 2004 (JP) ............................. 2004-152213

(51) Int. Cl.
*H04M 1/00* (2006.01)
(52) U.S. Cl. .............. 455/553.1; 455/552.1; 455/114.3; 455/431; 375/347
(58) Field of Classification Search .............. 455/553.1, 455/431
See application file for complete search history.

(56) References Cited

U.S. PATENT DOCUMENTS 5,535,248 A * 7/1996 Kurokami ................... 375/324
6,298,224 B1 * 10/2001 Peckham et al. .......... 455/188.1
6,466,768 B1 * 10/2002 Agahi-Kesheh et al. ....... 455/78
2004/0101067 A1 * 5/2004 Abe et al. .................... 375/322
2005/0113049 A1 * 5/2005 Takayama et al. ......... 455/150.1

FOREIGN PATENT DOCUMENTS

JP 2000-165269 6/2000
JP 2002-359569 A 12/2002

* cited by examiner

*Primary Examiner*—Duc Nguyen
*Assistant Examiner*—Adel Youssef
(74) *Attorney, Agent, or Firm*—Birch, Stewart, Kolasch & Birch, LLP

(57) ABSTRACT

A receiver accepts a digital signal having an upper side digital signal located in a higher frequency range on a frequency axis than an analog signal, and a lower side digital signal located in a lower frequency range on the frequency axis than the analog signal. A BPF (15) allows the analog signal to pass therethrough and a BPF (16) allows the analog signal and the digital signal to pass therethrough. BPFs (18) and (19) accept the output of the BPF (16) and output the upper side digital signal and the lower side digital signal, respectively. A digital receive level determining unit (20) and a selection SW (17) select either of the outputs of the BPFs (15) and (16) according to the receive levels of the upper side digital signal and the lower side digital signal, and output the selected output as a selected signal. The receiver then demodulates this selected signal.

15 Claims, 6 Drawing Sheets

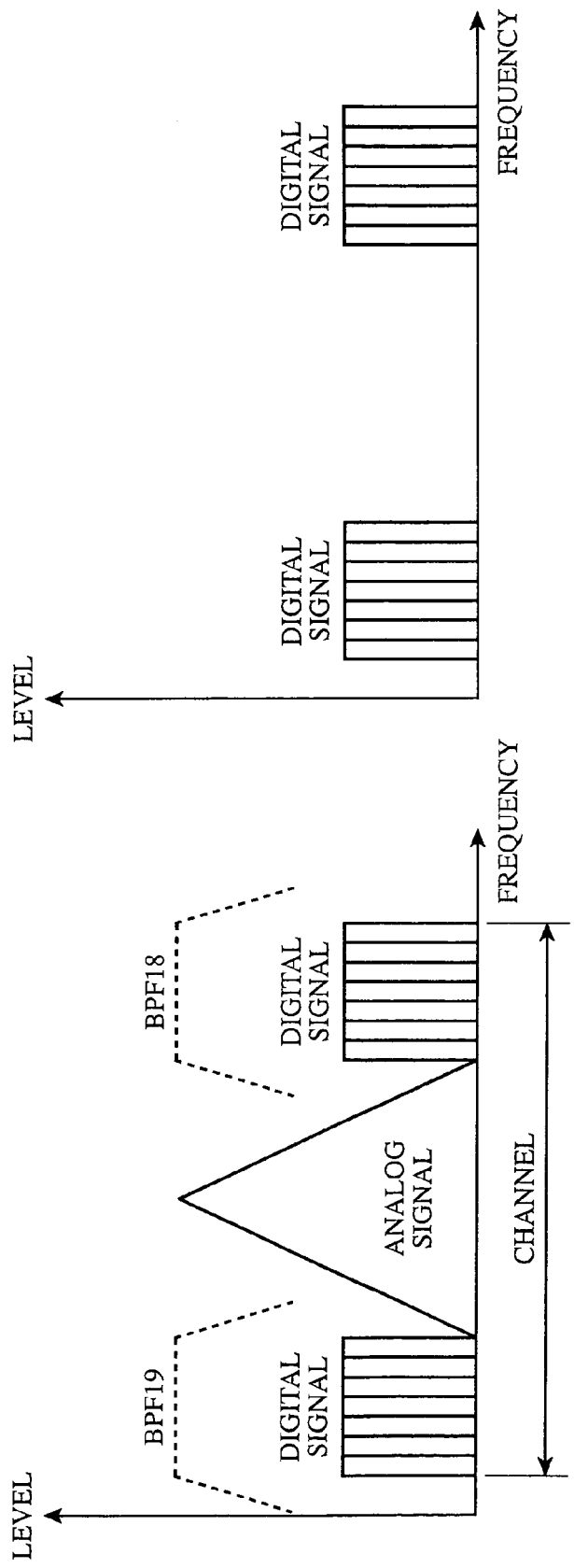

RECEIVER

BACKGROUND OF THE INVENTION

1. Field of the Invention

The present invention relates to a receiver for use in a transmission system in which an analog signal and a digital signal are simultaneously transmitted at the same center frequency. More particularly, it relates to a receiver that selectively receives either an analog signal or a digital signal.

2. Description of Related Art

In general, a receiver that selectively receives either an analog signal or a digital signal in a transmission system in which the analog signal and the digital signal are simultaneously transmitted at the same center frequency is known. For example, there has been proposed a broadcast system called an IBOC (In Band On Channel) system by U.S. iBiquity, as a broadcast system in which an analog broadcasting wave and a digital broadcasting wave are simultaneously broadcast by an identical broadcasting station.

In this IBOC system, a digital broadcasting wave is transmitted via a channel between analog broadcasting channels, and a multi-carrier transmission method is used for the digital broadcasting of the IBOC system. In this case, in order not to affect the analog broadcasting channels which are adjacent to the digital broadcasting channel, the digital broadcasting wave is transmitted with low transmission power compared with that for the analog broadcasting waves.

On the other hand, a related art receiver that can selectively receive either an analog broadcasting wave or a digital broadcasting wave performs reception switching in order to receive the analog broadcasting wave when the receive status of the digital broadcasting wave gets worse due to fading, interference waves, or the like and the receiver therefore enters a nonreceipt status, and performs switching to reception of the digital broadcasting wave when the receiver enters a status in which it can receive the digital broadcasting wave while receiving the analog broadcasting wave.

By the way, since the transmission power of the analog broadcasting is larger than that of the digital broadcasting, as mentioned above, an analog signal having a large amplitude and a digital signal having a small amplitude coexist in a predetermined frequency range of an intermediate frequency signal (IF signal) generated from a transmission wave from the broadcasting station, and therefore the above-mentioned receiver that can selectively receive either an analog broadcasting wave or a digital broadcasting wave needs to separate the analog signal and the digital signal from the IF signal.

To this end, the related art receiver extracts a signal which falls within a frequency range close to the center frequency of the IF signal and which is associated with the analog broadcasting by using one of a pair of band pass filters, and extracts only a signal associated with the digital broadcasting by removing the signal which falls within a frequency range close to the center frequency of the IF signal from the IF signal by using the other band pass filter. The related art receiver then outputs either of these signals selectively.

Furthermore, there has been provided a related art receiver that attenuates only signal components associated with analog broadcasting from an input transmission wave by using a band eliminate filter (BEF), furnishes the transmission wave to an analog-to-digital converter (ADC), and carries out digital demodulation of a signal associated with analog broadcasting and/or a signal associated with digital broadcasting outputted from the ADC by using a digital demodulator. In this related art receiver, an AGC (automatic gain control) voltage generating unit controls the gain of an IF amplifier placed in the front of the BEF according to the output of the BEF so as to increase the gain of the IF amplifier, and increases the signal level of the digital broadcasting relatively (see patent reference 1, for example).

[Patent reference 1] JP, 2002-359569,A (see pp. 4 to 5 and FIGS. 1 to 6)

A problem with related art receivers constructed as mentioned above is that while they can easily receive digital broadcasting waves since they attenuate only a signal component associated with analog broadcasting by using a BEF, in a case where digital broadcasting waves are located in both sides (i.e., a high-frequency side and a low-frequency side) of an analog broadcasting wave, they may determine that they can receive the digital broadcasting waves even when a multipass or the like occurs in one of the digital broadcasting waves and the status of reception of the digital broadcasting wave gets worse since they determine the receive level of the digital broadcasting by measuring the levels of the digital broadcasting waves in the both sides of the analog broadcasting wave.

Another problem with related art receivers is that in a case of reception of analog broadcasting, since related art receivers attenuate only a signal component associated with the analog broadcasting by using a BEF, as mentioned above, the level of the signal component associated with the analog broadcasting decreases and therefore the signal-to-noise (S/N) ratio decreases.

SUMMARY OF THE INVENTION

The present invention is made in order to solve the above-mentioned problems, and it is therefore an object of the present invention to provide a receiver that can properly determine whether it can receive a digital signal without reducing the S/N ratio in a case of reception of an analog signal.

In accordance with the present invention, there is provided a receiver that receives a transmission signal into which an analog signal and a digital signal are incorporated, their carriers having an identical center frequency and the digital signal having an upper side digital signal which is located in a higher frequency range on a frequency axis than the analog signal, and a lower side digital signal which is located in a lower frequency range on the frequency axis than the analog signal, and the receiver including a demodulating unit for selectively either demodulating the analog signal or the digital signal, the receiver further including: a first filter unit for allowing the analog signal to pass therethrough; a second filter unit for allowing both the analog signal and the digital signal to pass therethrough; a third filter unit for receiving an output of the second filter unit and for outputting both the upper side digital signal and the lower side digital signal; a selecting unit for select either of outputs of the first and the second filter unit; and a selection control unit for controlling the selecting unit according to receive levels of the upper side digital signal and the lower side digital signal, and for selectively furnishing either an output of the first filter unit or the output of the second filter unit to the demodulating unit.

As previously mentioned, since the receiver according to the present invention is so constructed as to extract only the analog signal from the input transmission signal, separate an upper side digital signal and a lower side digital signal from the digital signal, and selectively furnish either of the outputs of the first and the second filter units to the demodulating unit according to the receive levels of the upper side digital signal and the lower side digital signals, the present invention offers an advantage of being able to not only properly determine whether the receiver can receive the digital signal, and also prevent the S/N ratio from decreasing in the case of reception of the analog signal since the receiver does not attenuate the analog signal.

Further objects and advantages of the present invention will be apparent from the following description of the preferred embodiments of the invention as illustrated in the accompanying drawings.

BRIEF DESCRIPTION OF THE DRAWINGS

FIG. 3A shows signal waves applied to the narrow band pass filter and FIG. 3B shows signal waves outputted from the narrow band pass filter;

FIGS. 4A and 4B are diagrams for explaining the functionality of first and second band pass filters for use in the receiver shown in FIG. 1, and FIG. 4A shows signal wave applied to the first and second band pass filters and FIG. 3B shows signal waves outputted from the first and second band pass filters;

DETAILED DESCRIPTION OF THE PREFERRED EMBODIMENTS

Embodiment 1

Figure 1:
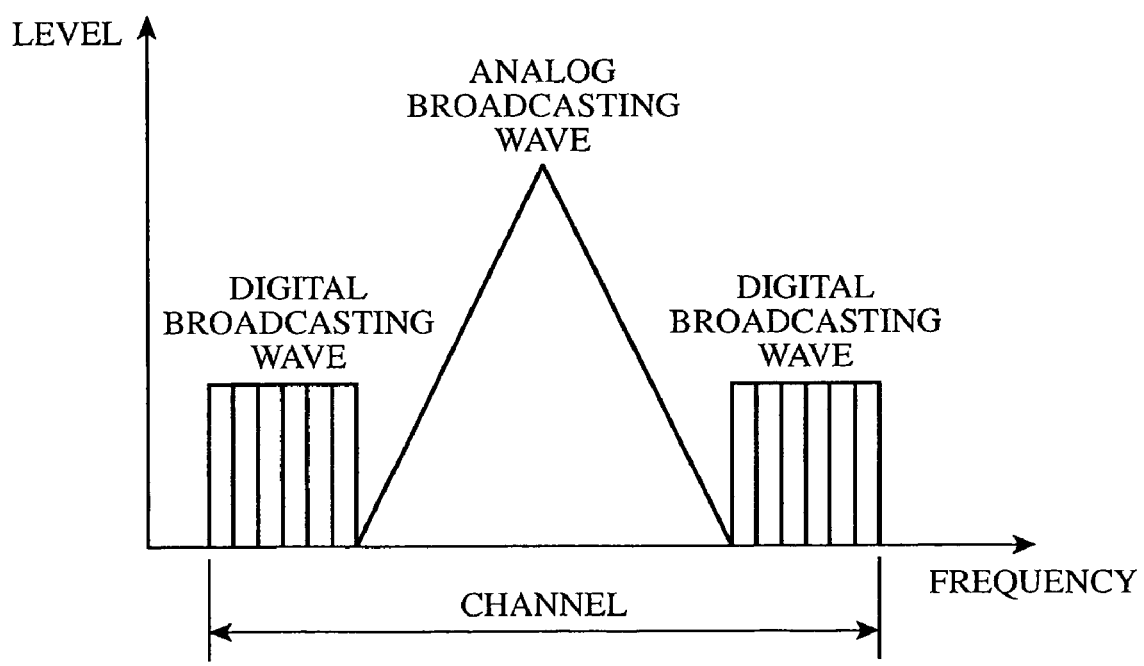
FIG. 1 is a diagram showing an example of broadcasting waves which are received by a receiver according to embodiment 1 of the present invention.

First, a system in which analog broadcasting waves and digital broadcasting waves are simultaneously transmitted will be explained with reference to FIG. 1 by taking an IBOC system as an example. FIG. 1 is a diagram showing a power spectrum distribution at a time of transmission of analog broadcasting waves and digital broadcasting waves in the IBOC system. In FIG. 1, the horizontal axis shows frequencies and the vertical axis shows the intensity (i.e., level) of the power spectrum of the broadcasting waves.

The horizontal axis shows an offset from the center frequency of an analog broadcasting wave (for example, an FM signal audio broadcasting wave) which is set to a point of origin. A digital broadcasting wave is transmitted using a frequency range between analog broadcasting waves, and the digital broadcasting wave has the same center frequency as the analog broadcasting waves and has a power spectrum which is distributed outside the power spectrum of an analog broadcasting wave.

In a case where analog broadcasting and digital broadcasting are carried out simultaneously, a broadcasting station transmits an analog broadcasting wave and a digital broadcasting wave by using an identical antenna, and a receiver receives them by using an identical antenna. For this reason, the power spectrums of the digital broadcasting wave and the analog broadcasting wave transmitted from the broadcasting station have intensities in a predetermined ratio, and also have intensities in the same ratio when the digital broadcasting wave and the analog broadcasting wave are received by the receiver. When the IBOC system simultaneously broadcasts an analog broadcasting wave and a digital broadcasting wave at the same center frequency, it prevents interference between them by preventing their power spectrums from overlapping each other.

Figure 2:
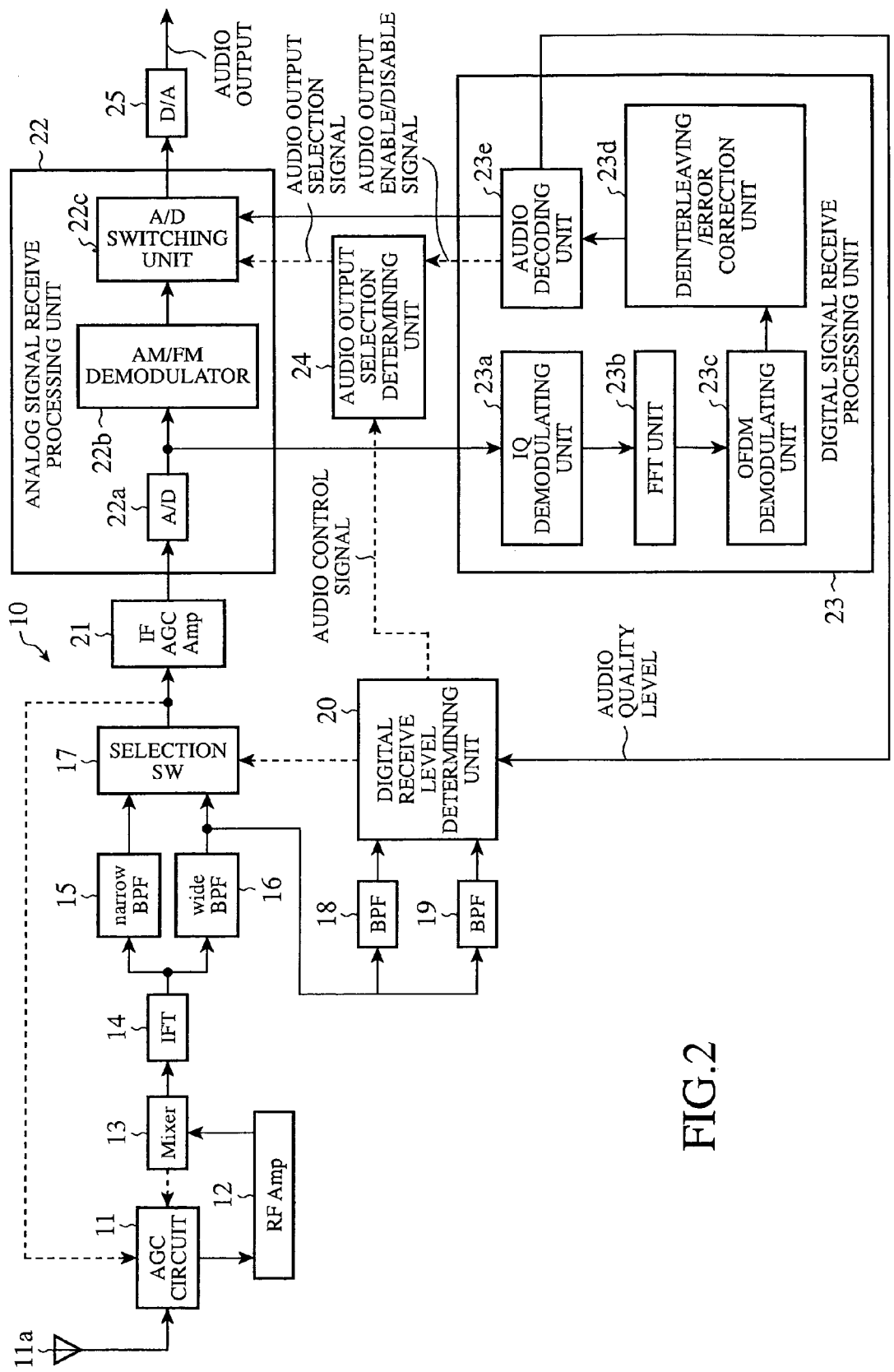
FIG. 2 is a block diagram schematically showing an example of the structure of the receiver according to embodiment 1 of the present invention.

FIG. 2 is a block diagram showing an example of the receiver according to embodiment 1 of the present invention. In the following explanation, a case where the analog broadcasting wave is an FM or AM broadcasting signal and the digital broadcasting wave is a DAB audio broadcasting signal will be taken as an example. In addition, it is assumed that an OFDM (Orthogonal Frequency Division Multiplex) method is used as a modulation technique which the DAB system uses.

The receiver 10 is provided with an automatic gain control (AGC) circuit 11, a high-frequency amplifier (RF Amp) 12, a mixer 13, and an intermediate frequency transformer (IFT) 14. Broadcasting waves received via the antenna 11a are furnished from the AGC circuit 11 to the RF Amp 12. An RF signal amplified by the RF Amp 12 is furnished to the mixer 13, and an intermediate frequency signal (i.e., an IF signal) is outputted from the mixer 13. The AGC circuit 11 then carries out AGC based on the IF signal from the mixer 13.

The receiver 10 shown is provided with a narrow band pass filter (or narrow BPF) 15 and a wide band pass filter (or wide BPF) 16, and the IF signal is furnished to the narrow BPF 15 and the wide BPF 16 via the IFT 14. The BPF 15 allows a signal corresponding to the analog broadcasting wave (referred to as an analog signal from here on) to pass therethrough, and the wide BPF 16 allows the analog signal and a signal corresponding to the digital broadcasting wave (referred to as a digital signal from here on) to pass therethrough.

Figure 3A:
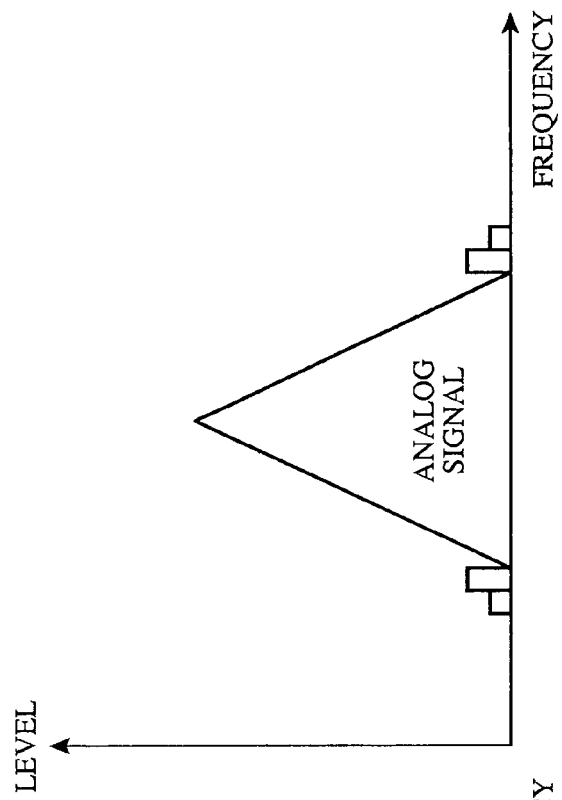
FIGS. 3A and 3B are diagrams for explaining the functionality of a narrow band pass filter for use in the receiver shown in FIG. 1.
Figure 3B:
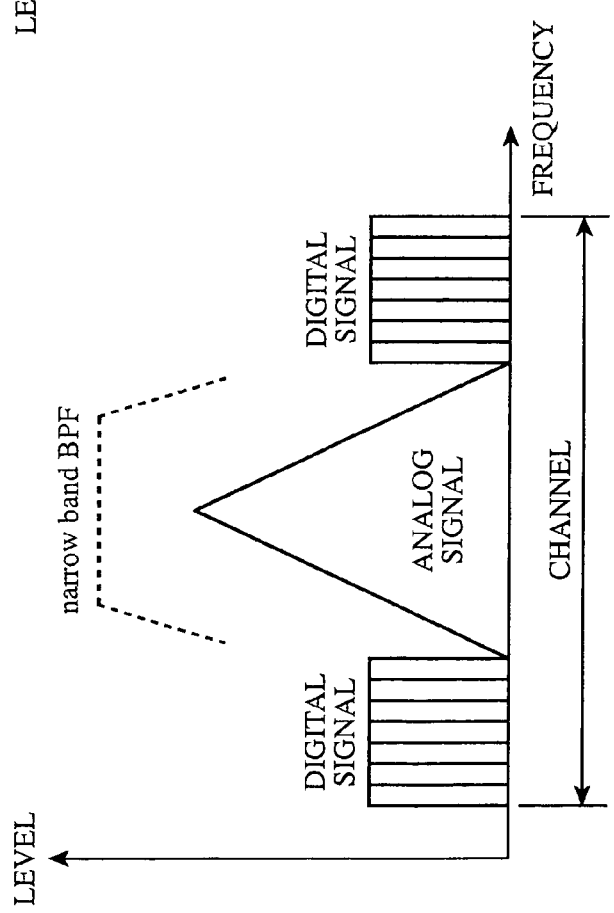

In other words, when the IF signal as shown in FIG. 3A is furnished to the narrow BPF 15, the narrow BPF 15 attenuates the digital signal while outputting the analog signal, as shown in FIG. 3B. In the following explanation, a signal outputted from the wide BPF 16 will be referred to as a composite signal.

The output of the narrow BPF 15 (i.e., the analog signal) and the output of the wide BPF 16 (i.e., the composite signal) are furnished to a selection switching unit (or selection SW) 17, and the composite signal is further furnished to first and second BPFs 18 and 19. As shown in FIG. 4A, the first BPF 18 corresponds to a digital signal located in a frequency range higher than that of the analog signal (this digital signal is referred to as an upper side digital signal from here on), and the second BPF 19 corresponds to a digital signal located in a frequency range lower than that of the analog signal (this digital signal is referred to as a lower side digital signal from here on).

As a result, the first BPF 18 allows only the upper side digital signal included in the composite signal to pass therethrough, and the second BPF 19 allows only the lower side digital signal included in the composite signal to pass therethrough. As shown in the FIG. 4B, the upper side digital signal and the lower side digital signal are outputted from the first and second BPFs 18 and 19, respectively.

The upper side digital signal and the lower side digital signal are furnished to a digital receive level determining unit 20. The digital receive level determining unit 20 determines the receive levels of the upper side digital signal and the lower side digital signal to acquire determination results in such a manner as mentioned later. Based on the determination results, the digital receive level determining unit 20 controls switching of the selection SW 17. As a result, either the analog signal or the composite signal is furnished, as a selected signal, to an intermediate frequency automatic gain control amplifier (IF AGC Amp) 21. This selected signal can be also furnished to the AGC circuit 11 as indicated by a dashed line arrow so that the AGC circuit 11 carries out AGC according to the selected signal.

The amplified selected signal outputted from the IF AGC Amp 21 is then furnished to an analog signal receive processing unit 22. The analog signal receive processing unit 22 is provided with an analog to digital (A/D) converter 22a, an AM/FM demodulator 22b, and an A/D switching unit 22c. The A/D converter 22a digitizes (i.e., quantizes) the selected signal from the IF AGC Amp 21 so as to generate a quantized signal. This quantized signal is then furnished to a digital signal receive processing unit 23 while it is furnished to the AM/FM demodulator 22b.

The AM/FM demodulator 22b carries out AM/FM demodulation of the quantized signal from the A/D converter 22a, and then furnishes the AM/FM demodulated signal to the A/D switching unit 22c as a first demodulated signal (i.e., a first audio signal). The digital signal receive processing unit 23 has an IQ demodulating unit 23a, an FFT unit 23b, an OFDM demodulating unit 23c, a deinterleaving/error correction unit 23d, and an audio decoding unit 23e. The IQ demodulating unit 23a receives the quantized signal from the A/D converter 22a and generates an I signal and a Q signal from the quantized signal.

The FFT unit 23b then carries out fast Fourier transformation of these I and Q signals and then furnishes Fourier-transformed signals to the OFDM demodulating unit 23b, and the OFDM demodulating unit 23b carries out OFDM demodulation of the Fourier-transformed I and Q signals. The deinterleaving/error correction unit 23d then performs deinterleaving and detection and correction of error codes on the OFDM-demodulated I and Q signals. The audio decoder 23e further decodes the output (i.e., the error-corrected output) of the deinterleaving/error correction unit 23d, and outputs the decoded output to the A/D switching unit 22c as a second decoded signal (i.e., a second audio signal).

On the other hand, the audio decoder 23e generates an audio output enable/disable signal according to the error-corrected output of the deinterleaving/error correction unit 23d. That is, the audio decoder 23e outputs an audio output enable/disable signal indicating that the output of the second audio signal is disabled when the deinterleaving/error correction unit 23d determines that the error correction is impossible, whereas the audio decoder 23e outputs an audio output enable/disable signal indicating that the output of the second audio signal is enabled when the deinterleaving/error correction unit 23d determines that the error correction is possible. The audio decoder 23e furnishes this audio output enable/disable signal to an audio output selection determining unit 24.

The audio decoder 23e generates an audio quality signal indicating the quality of the second audio signal according to the error-corrected output of the deinterleaving/error correction unit 23d. For example, the audio decoder 23e has a list of audio quality levels used for determining the quality of the second audio signal, and determines the quality of the second audio signal by selecting an audio quality level corresponding to the error-corrected output of the deinterleaving/error correction unit 23d from the list. The audio decoder 23e furnishes an audio quality signal indicating the selected audio quality level to the digital receive level determining unit 20.

The digital receive level determining unit 20 generates an audio control signal indicating whether switching is enabled or disabled according to the audio quality signal from the audio decoder 23e, and furnishes the audio control signal to the audio output selection determining unit 24. The audio output selection determining unit 24 generates an audio output selection signal based on the above-mentioned audio output enable/disable signal from the audio decoder 23e and the above-mentioned audio control signal from the digital receive level determining unit 20, and furnishes the audio output selection signal to the A/D switching unit 22c.

To be more specific, the digital receive level determining unit 20 outputs an audio control signal indicating that switching is enabled when the audio quality signal indicates that the audio quality level (i.e., the quality of the second audio signal) is equal to or higher than a predetermined quality threshold, whereas the digital receive level determining unit 20 outputs an audio control signal indicating that switching is disabled when the audio quality signal indicates that the quality of the second audio signal is lower than the predetermined quality.

When the audio output enable/disable signal indicates that the output of the second audio signal is disabled, the audio output selection determining unit 24 furnishes an audio output selection signal indicating selection of the first audio signal to the A/D switching unit 22c. In this case, that is, when the error correction is impossible, the audio quality level is lower than the predetermined quality threshold and the digital receive level determining unit 20 controls the selection SW 17 so as to select the output of the narrow BPF 15.

When the audio output enable/disable signal indicates that the output of the second audio signal is enabled, the audio output selection determining unit 24 determines whether the audio control signal indicates that switching is enabled, and, when determining that the audio control signal indicates that switching is enabled, furnishes an audio output selection signal indicating selection of the second audio signal to the A/D switching unit 22c.

On the other hand, when the audio output enable/disable signal indicates that the output of the second audio signal is disabled, the audio output selection determining unit 24 furnishes an audio output selection signal indicating selection of the first audio signal to the A/D switching unit 22c. In this case, since the audio quality level is lower than the predetermined quality threshold, the digital receive level determining unit 20 controls the selection SW 17 so as to select the output of the narrow BPF 15.

Thus, the A/D switching unit 22c selects either of the first and second audio signals in response to the audio output selection signal from the audio output selection determining unit 24 and outputs the selected audio signal as an output audio signal. A digital to analog (D/A) converter 25 then carries out D/A conversion of the output audio signal from the A/D switching unit 22c, and sends the digital-to-analog-converted audio signal, as an audio output, to a speaker (not shown).

Figure 5:
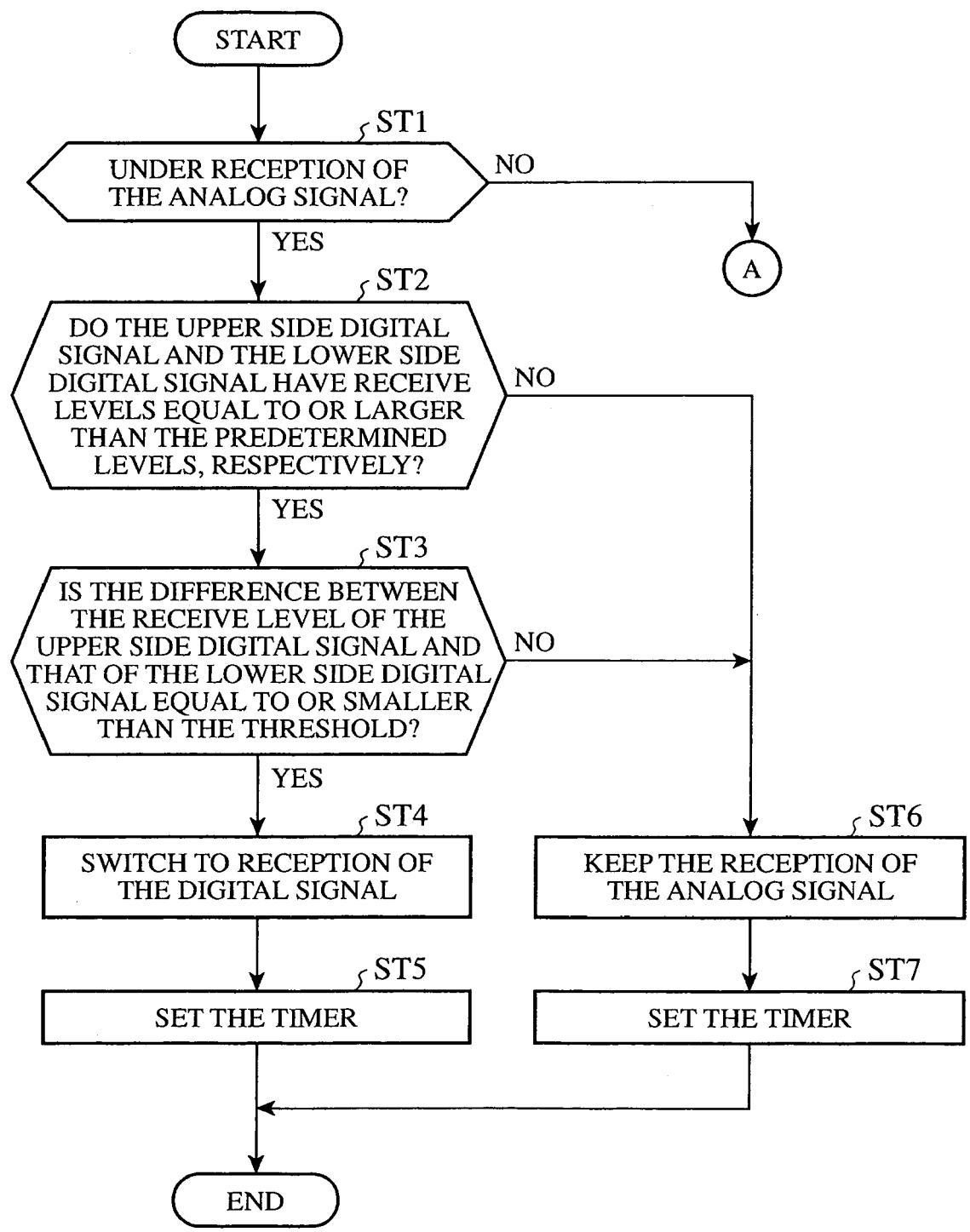
FIG. 5 is a flow chart for explaining an operation of selectively receiving either an analog signal or a digital signal in the receiver shown in FIG. 1.

Next, the operation of the receiver in accordance with this embodiment of the present invention will be explained. Referring now to FIGS. 1 and 5, assume that a user turns on a power switch of the receiver 10 and selects a desired broadcasting station. The receiver 10 shown in FIG. 2 selects a digital broadcasting wave with priority, and outputs it.

The digital receive level determining unit 20 determines whether or not the receiver is selecting (or receiving) an analog broadcasting wave first (in step ST1). When determining that the receiver is receiving an analog broadcasting wave (that is, the selection SW 17 is selecting the narrow BPF 15), the digital receive level determining unit 20 further, in step ST2, determines whether the receive levels of the upper side digital signal and the lower side digital signal are equal to or larger than predetermined receive levels, respectively (i.e., whether the upper side digital signal and the lower side digital signal have certain levels, respectively).

When determining that the receive levels of the upper side digital signal and the lower side digital signal are equal to or larger than the predetermined receive levels, respectively, the digital receive level determining unit 20, in step ST3, determines whether the difference (output difference) between the receive level of the upper side digital signal and that of the lower side digital signal is equal to or smaller than a predetermined threshold (i.e., whether or not the output difference is equal to or smaller than a threshold).

When determining that the difference between the receive level of the upper side digital signal and that of the lower side digital signal is equal to or smaller than the predetermined threshold, the digital receive level determining unit 20, in step ST4, determines that it can receive the digital broadcasting wave, and controls the switching of the selection SW 17 so as to furnish the output of the wide BPF 16 (i.e., the composite signal), as the selected signal, to the IFAGC Amp 21 (i.e., switches to reception of the digital broadcasting wave).

After that, the digital receive level determining unit 20, in step ST5, sets a predetermined time interval to a built-in timer (not shown) (i.e., sets the timer), and then enters a standby state (i.e., ends the current process). In other words, the digital receive level determining unit 20 performs the processing by determining whether either the analog broadcasting wave or the digital broadcasting wave is selected at the predetermined time intervals set to the built-in timer.

On the other hand, when, in step ST2, determining that the receive levels of the upper side digital signal and the lower side digital signal are smaller than the predetermined receive levels, respectively, the digital receive level determining unit 20, in step ST6, keeps the selection of the analog broadcasting wave (i.e., holds the selection of the analog broadcasting wave). The digital receive level determining unit 20 then sets the timer (in step ST7), and enters a standby state.

Similarly, when, in step ST3, determining that the difference between the receive level of the upper side digital signal and that of the lower side digital signal exceeds the predetermined threshold, the digital receive level determining unit 20 advances to step ST6 in which it keeps the reception of the analog broadcasting wave.

Figure 6:
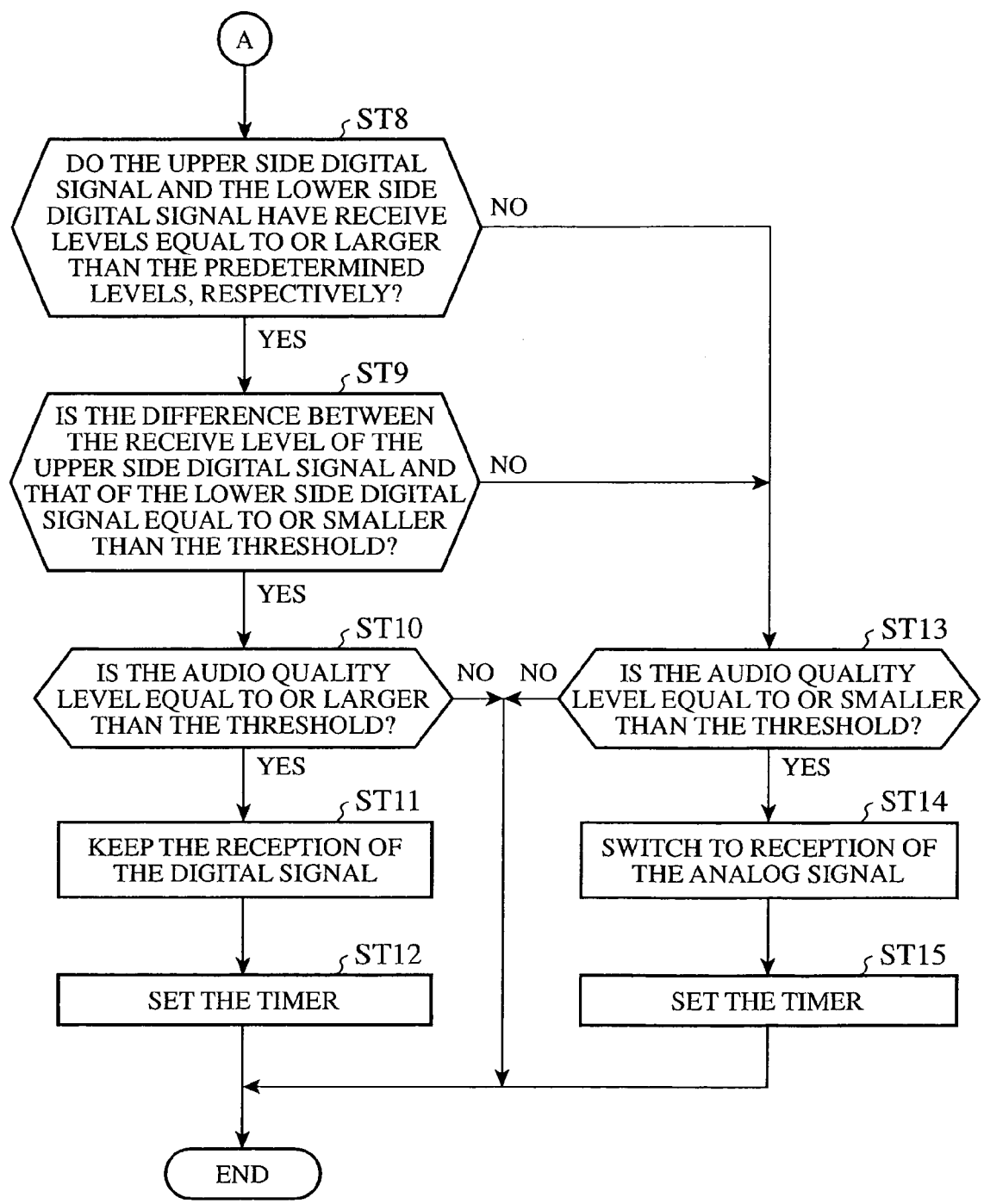
FIG. 6 is a flow chart for explaining the operation of selectively receiving either the analog signal or the digital signal in the receiver shown in FIG. 1.

Referring now to FIG. 6, when, in step ST1, determining that the receiver is not receiving the analog broadcasting wave now, the digital receive level determining unit 20 advances to "A" shown in FIG. 5. In this case, the digital receive level determining unit 20 determines that the receiver is selecting (or receiving) the digital broadcasting wave now, and then, in step ST8, determines whether the receive levels of the upper side digital signal and the lower side digital signal are equal to or larger than the predetermined receive levels, respectively (i.e., whether the upper side digital signal and the lower side digital signal have certain levels, respectively).

When determining that the receive levels of the upper side digital signal and the lower side digital signal are equal to or larger than the predetermined receive levels, respectively, the digital receive level determining unit 20 further, in step ST9, determines whether the difference between the receive level of the upper side digital signal and that of the lower side digital signal is equal to or smaller than the predetermined threshold (i.e., whether or not the output difference is equal to or smaller than a threshold).

When determining that the difference between the receive level of the upper side digital signal and that of the lower side digital signal is equal to or smaller than the predetermined threshold, the digital receive level determining unit 20 further, in step ST10, determines whether the audio quality level (i.e., the quality of the second audio signal) is equal to or higher than the predetermined quality threshold. When then determining that the audio quality level is equal to or higher than the predetermined quality threshold, the digital receive level determining unit 20 outputs the audio control signal indicating that switching is enabled, and, when the audio output enable/disable signal from the audio decoder 23e indicates that the output of the second audio signal is enabled, the A/D switching unit 22c, in step ST11, keeps the selection of the second audio signal according to the audio output selection signal from the audio output selection determining unit 24 (i.e., holds the selection of the digital broadcasting wave).

After that, the digital receive level determining unit 20, in step ST12, sets a predetermined time interval to the built-in timer (not shown) (i.e., sets the timer), and then enters a standby state (i.e., ends the current process). On the other hand, when, in step ST8, determining that the receive levels of the upper side digital signal and the lower side digital signal are smaller than the predetermined receive levels, respectively, the digital receive level determining unit 20 further determines whether the audio quality level is equal to or smaller than the predetermined threshold (in step ST13).

When the audio quality level is equal to or smaller than the predetermined threshold, the digital receive level determining unit 20 controls the selection SW17 so as to select the output of the BPF 15 (i.e., the analog signal), outputs the audio control signal, and then, in step ST14, brings the A/D switching unit 22c into a state in which it selects the first audio signal by virtue of the audio output selection determining unit 24 (i.e., switches to the selection of the analog signal). The digital receive level determining unit 20 then sets the timer (in step ST15), and enters a standby state.

When, in step ST9, determining that the difference between the receive level of the upper side digital signal and that of the lower side digital signal exceeds the predetermined threshold, the digital receive level determining unit 20 advances to step ST13. When, in step ST10, determining that the audio quality level is smaller than the predetermined threshold, the digital receive level determining unit 20 enters a standby state. When, in step ST13, determining that the audio quality level exceeds the predetermined threshold, the digital receive level determining unit 20 similarly enters a standby state.

As can be seen from the above explanation, the narrow BPF 15 functions as a first filter means, and the wide BPF 16 functions as a second filter means. The BPFs 18 and 19 function as a third filter means, and the digital receive level determining unit 20 and the selection SW17 function as a selection control means and a selecting means, respectively.

In addition, the AM/FM demodulator 22b functions as a first demodulating unit, and the IQ demodulating unit 23a, FFT unit 23b, the OFDM demodulating unit 23c, the deinterleaving/error correction unit 23d, and the audio decoder 23e function as a second demodulating unit. The deinterleaving/error correction unit 23d and the audio decoder 23e function as a quality detection means, and the audio output selection determining unit 24 and the A/D switching unit 22c function as a switching means.

As mentioned above, the receiver according to this embodiment 1 is so constructed as to extract only an analog signal from an input signal by using the narrow BPF 15, extract the analog signal and a digital signal from the input signal by using the wide BPF 16, extract an upper side digital signal and a lower side digital signal from the output of the BPF 16 by using the first and second BPFs 18 and 19, select, as a selected signal, either of the outputs of the narrow and wide BPFs 15 and 16 according to the receive levels of the upper side digital signal and the lower side digital signal, and demodulate this selected signal. Therefore, the present embodiment offers an advantage of being able to not only properly determine whether the receiver can receive the digital signal, and also prevent the S/N ratio from decreasing in the case of reception of the analog signal since the receiver does not attenuate the analog signal.

In addition, the receiver according to this embodiment 1 is so constructed as to demodulate the output of the wide BPF 16 as the selected signal when the receive levels of the upper side digital signal and the lower side digital signal are equal to or larger than predetermined receive levels, respectively, and the difference between the receive level of the upper side digital signal and that of the lower side digital signal is equal to or smaller than a predetermined threshold. Therefore, the present embodiment offers another advantage of being able to determine whether the receiver can receive the digital signal with a high degree of precision.

The receiver according to this embodiment 1 is provided with the first demodulating unit that demodulates the analog signal so as to generate a first demodulated signal and the second demodulating unit that demodulates the digital signal so as to generate a second demodulated signal, and is so constructed as to detect the quality of the digital signal, output an audio quality level showing the quality of the digital signal, and output the second demodulated signal when the audio quality level is equal to or larger than a predetermined threshold. Therefore, the present embodiment offers a further advantage of being able to demodulate only a good-quality digital signal so as to output a demodulated signal.

In addition, the receiver according to this embodiment 1 is so constructed as to select the output of the narrow BPF 15 as the selected signal and output the first demodulated signal if the audio quality level is smaller than the predetermined threshold when the receive levels of the upper side digital signal and the lower side digital signal are smaller than predetermined receive levels, respectively, or the difference between the receive level of the upper side digital signal and that of the lower side digital signal is larger than the predetermined threshold. Therefore, the present embodiment offers another advantage of being able to surely select the analog signal.

Many widely different embodiments of the present invention may be constructed without departing from the spirit and scope of the present invention. It should be understood that the present invention is not limited to the specific embodiments described in the specification, except as defined in the appended claims.

What is claimed is:

1. A receiver that receives a transmission signal into which an analog signal and a digital signal are incorporated, the carriers of said analog and digital signal having an identical center frequency, said digital signal having an upper side digital signal which is located in a higher frequency range on a frequency axis than said analog signal and a lower side digital signal which is located in a lower frequency range on the frequency axis than said analog signal, and said receiver including a signal processing device configured to selectively demodulate either said analog signal or said digital signal, said receiver comprising:

a first filter means for filtering said transmission signal such that said upper side and lower side digital signals are attenuated and said analog signal is allowed to pass through an output of said first filter means;

a second filter means for filtering said transmission signal such that said analog signal and said upper side and lower side digital signals are allowed to pass through an output of said second filter means;

a third filter means for receiving an output of said second filter means and for outputting both said upper side digital signal and said lower side digital signal;

a selecting unit for selecting either the output of said first filter means or the output of said second filter means to be furnished to said signal processing device; and a selection controller for receiving the output of said third filter means and for determining receive levels of said upper side digital signal and said lower side digital signal to control a selecting operation of said selecting unit according to the determined receive levels.

2. The receiver according to claim 1, wherein when the receive levels of said upper side digital signal and said lower side digital signal are equal to or larger than predetermined receive levels, respectively, and a difference between the receive level of said upper side digital signal and that of said lower side digital signal is equal to or smaller than a predetermined threshold, said selection controller controls said selecting unit so as to furnish the output of the second filter means to said signal processing device.

3. The receiver according to claim 1, wherein said signal processing device includes a first demodulating unit for demodulating said analog signal so as to acquire a first demodulated signal, and a second demodulating unit for demodulating said digital signal so as to acquire a second demodulated signal.

4. The receiver according to claim 3, wherein said signal processing device is further configured to detect a quality of said digital signal and further includes a switching unit for switching between said first and second demodulated signals, wherein said selection controller controls said switching unit so as to output said second demodulated signal when the detected quality of said digital signal is equal to or higher than a predetermined quality.

5. The receiver according to claim 4, wherein said selection controller controls the selecting unit to furnish the output of said first filter means to said signal processing device, and controls said switching unit to output the first demodulated signal, if the detected quality is lower than the predetermined quality and at least one of the following conditions occur:

the receive levels of said upper side digital signal and said lower side digital signal are smaller than the predetermined levels, respectively, and the difference between the receive level of said upper side digital signal and that of said lower side digital signal is larger than the predetermined threshold.

6. The receiver according to claim 2, wherein said signal processing unit includes a first demodulating unit for demodulating said analog signal so as to acquire a first demodulated signal, and a second demodulating unit for demodulating said digital signal so as to acquire a second demodulated signal.

7. The receiver according to claim 6, wherein said signal processing device is further configured to detect a quality of said digital signal, and further includes a switching unit for switching between said first and second demodulated signals, wherein said selection controller controls said switching unit so as to output said second demodulated signal when the detected quality of said digital signal is equal to or higher than a predetermined quality.

8. The receiver according to claim 7, wherein said selection controller controls the selecting unit to furnish the output of said first filter means to said signal processing device, and controls said switching unit to output the first demodulated signal, if the detected quality of said digital signal is lower than the predetermined quality, and at least one of the following conditions occur:

the receive levels of said upper side digital signal and said lower side digital signal are smaller than the predetermined levels, respectively, and the difference between the receive level of said upper side digital signal and that of said lower side digital signal is larger than the predetermined threshold.

9. The receiver according to claim 1, wherein the third filtering means is configured to attenuate said analog signal, and output said upper side and lower side digital signals as separate signals to said selection controller.

10. A receiver that receives a transmission signal into which an analog signal and a digital signal are incorporated, the carriers of the analog and digital signal having an identical center frequency, the digital signal having an upper side digital signal which is located in a higher frequency range on a frequency axis than the analog signal and a lower side digital signal which is located in a lower frequency range on the frequency axis than the analog signal, the receiver comprising:
a narrow band pass filter configured with a pass band centered substantially at the identical center frequency of the carriers of the analog and digital signals, the narrow band pass filter further being configured to receive and filter the transmission signal such that the upper side and lower side digital signals are attenuated and the analog signal is allowed to pass through an output of the narrow band pass filter;
a wide band pass filter configured to receive and filter the transmission signal such that the analog signal and the upper side and lower side digital signals to pass through an output of the wide band pass filter;
first and second band pass filters operably connected to the output of the wide band pass filter in order to receive the filtered transmission signal output by the wide band pass filter, the first band pass filter further being configured to pass through the upper side digital signal while attenuating the analog signal and the lower side digital signal, the second band pass filter further being configured to pass through the lower side digital signal while attenuating the analog signal and the upper side digital signal;
a selecting unit operably connected to the outputs of the narrow and wide band pass filters, the selecting unit being configured to output a selected one of the outputs of the narrow band pass filter means and the wide band pass filter;
a signal processing device configured to receive the output of the selecting unit, the signal processing device further being configured to demodulate either the analog signal or the digital signal from the selected one of the outputs of the narrow and wide band pass filters; and
a selection controller configured to receive the outputs of the first and second band pass filters and control which of the outputs of the narrow and wide band pass filters is selected to be output by the selecting unit to the signal processing device according to receive levels of the upper side digital signal and the lower side digital signal.

11. A method comprising:
receiving a transmission signal into which an analog signal and a digital signal are incorporated, the carriers of the analog and digital signal having an identical center frequency, the digital signal having an upper side digital signal which is located in a higher frequency range on a frequency axis than the analog signal and a lower side digital signal which is located in a lower frequency range on the frequency axis than the analog signal;
applying narrow band pass filtering to the received transmission signal which attenuates the upper side and lower side digital signals while passing through the analog signal;
applying wide band pass filtering to the received transmission signal which passes through the analog signal and the upper side and lower side digital signals;
applying additional filtering to the resultant signal of the wide band pass filtering to attenuate the analog signal while passing through the upper side digital signal and the lower side digital signals;
selecting the resultant signal of either the narrow band filtering or the wide band filtering according to receive levels of the upper side digital signal and the lower side digital signal passed through by the additional filtering; and
selectively demodulating either the analog signal or the digital signal from the selected resultant signal of filtering.

12. The method according to claim 11, wherein
the selecting step selects the resultant signal of the wide band filtering when the following conditions are satisfied:
the receive levels of the upper side digital signal and said lower side digital signal passed through by the additional filtering are equal to or larger than predetermined receive levels, respectively, and
a difference between the receive levels of the upper side digital signal and the lower side digital signal pass through by the additional filtering is equal to or smaller than a predetermined threshold.

13. The receiver according to claim 11, further comprising:
demodulating both the analog and digital signal from the selected resultant signal of filtering; and
detecting a quality of the digital signal;
switching between the demodulated analog signal and the demodulated digital signals based on the detected quality, wherein the demodulated digital signal is selected when detected quality is equal to or higher than a predetermined quality.

14. The method according to claim 11, wherein
the selecting step selects the resultant signal of the narrow band filtering when the following conditions are satisfied:
the receive levels of the upper side digital signal and said lower side digital signal passed through by the additional filtering are smaller than predetermined receive levels, respectively, and
a difference between the receive levels of the upper side digital signal and the lower side digital signal pass through by the additional filtering is larger than a predetermined threshold.

15. The receiver according to claim 1, wherein the additional filtering is performed using separate band pass filters to pass through the upper side and lower side digital signals, respectively.

* * * * *